United States Patent
Ogawa

Patent Number: 5,938,349
Date of Patent: Aug. 17, 1999

[54] THRUST BEARING

[75] Inventor: Yoshitaka Ogawa, Gifu, Japan

[73] Assignee: Nippon Thompson Co., Ltd., Tokyo, Japan

[21] Appl. No.: 08/819,200

[22] Filed: Mar. 17, 1997

Related U.S. Application Data

[63] Continuation of application No. 08/462,903, Jun. 5, 1995, abandoned.

[30] Foreign Application Priority Data

Jun. 7, 1994 [JP] Japan .................................. 6-148705

[51] Int. Cl.$^6$ .......................... F16C 33/58; F16C 33/02; F16C 33/46
[52] U.S. Cl. ........................ 384/615; 384/617; 384/620; 384/621
[58] Field of Search .................................... 384/620, 621, 384/622, 623, 618, 607, 609, 615, 617

[56] References Cited

U.S. PATENT DOCUMENTS

| 3,240,542 | 3/1966 | Jahn | 384/620 |
| 3,240,543 | 3/1966 | Benson | 384/618 |
| 4,166,662 | 9/1979 | Chiba et al. | 384/618 |
| 5,232,290 | 8/1993 | Buschle et al. | 384/620 |

FOREIGN PATENT DOCUMENTS

| 1324691 | 3/1963 | France | 384/618 |
| 1344826 | 10/1963 | France | 384/623 |
| 1099809 | 2/1961 | Germany | 384/623 |
| 1031105 | 5/1966 | United Kingdom | 384/622 |

*Primary Examiner*—John A. Jeffery
*Assistant Examiner*—Matthew A. Kaness
*Attorney, Agent, or Firm*—Sughrue, Mion, Zinn, Macpeak & Seas, PLLC

[57] ABSTRACT

A thrust bearing includes a flange formed on the outside of only a first bearing washer, a second bearing washer formed into a simple flat plate, a notch having a rectangular cross-section formed on the outside of the second bearing washer, and a leading edge of the flange bent so that it is inserted into the notch.

3 Claims, 6 Drawing Sheets

THRUST BEARING

This is a Continuation of application Ser. No. 08/462,903 filed Jun. 5, 1995 now abandoned.

BACKGROUND OF THE INVENTION

1. Field of the Invention

The present invention relates to a thrust bearing, and more particularly, to a thrust bearing that improves ease of handling by integrally assembling a bearing washer, rolling elements and cage in a non-separated form, thereby improving ease of assembly when assembling for use in, for example, automobile steering or other general mechanical apparatuses.

2. Description of the Prior Art

Figure 1:
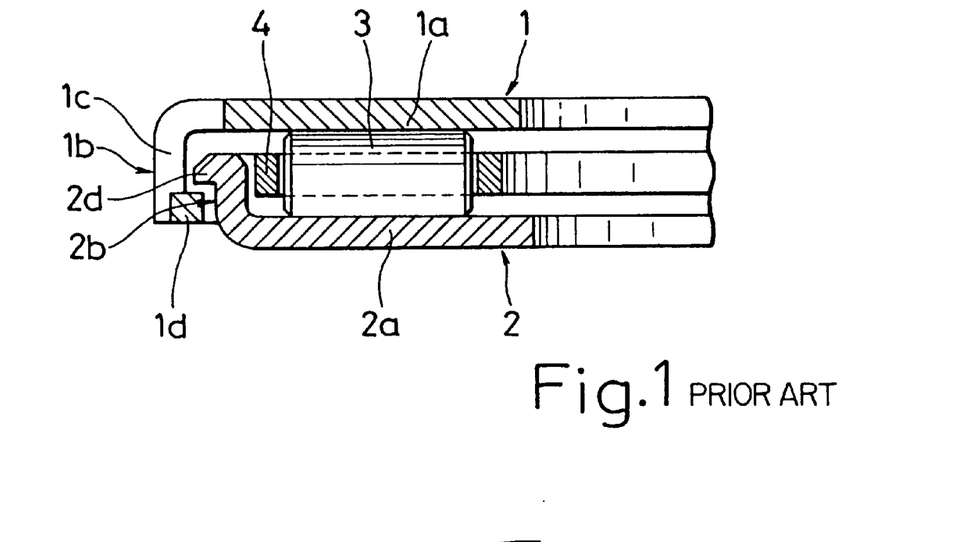
FIG. 1 is a longitudinal cross-sectional view of a portion of a thrust bearing as a first example of the prior art.
Figure 2:
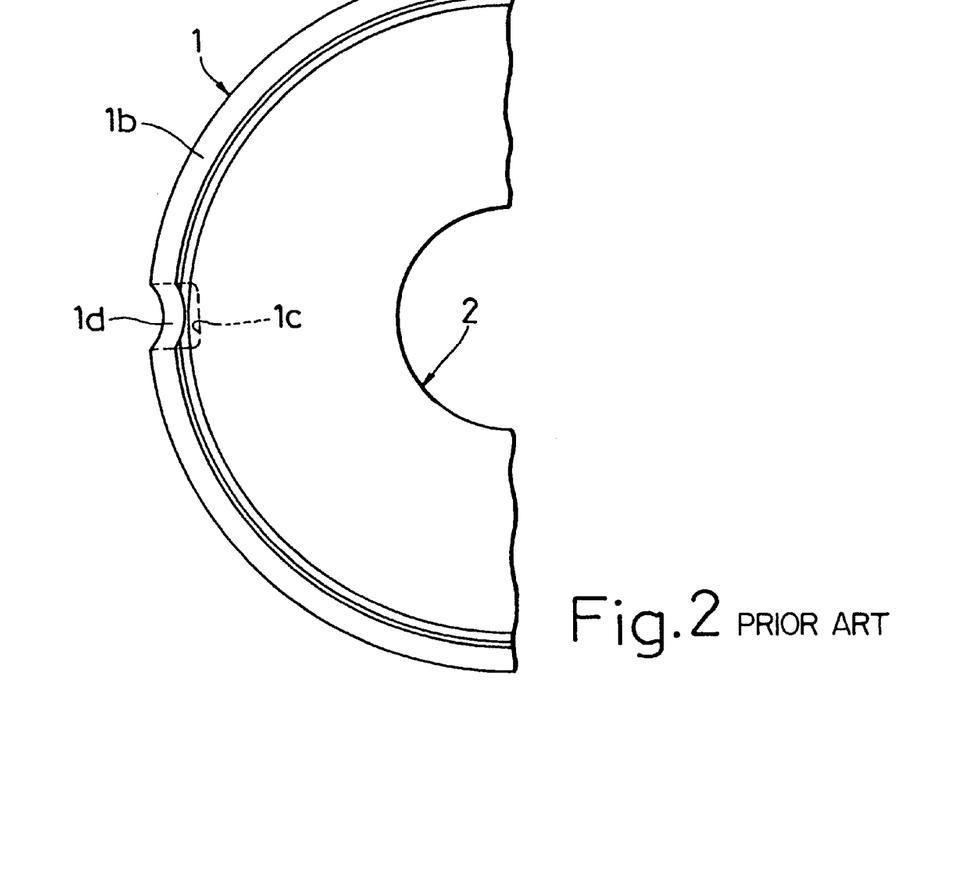
FIG. 2 is a bottom view of a portion of the thrust bearing shown in FIG. 1.

An example of this type of thrust bearing of the prior art is shown in FIGS. 1 and 2. Furthermore, said thrust bearing is disclosed in Japanese Laid-Open Patent Publication No. 57-114031. As shown in the drawings, this thrust bearing is equipped with a first bearing washer 1 and a second bearing washer 2, arranged so that each track 1a and track 2a faces the other, a plurality of rolling elements in the form of rollers 3, arranged and juxtaposed along the circumferential direction between said tracks 1a and 2a, and a cage 4 formed into a circular shape that holds and guides these rollers 3. Together with cylindrical flanges 1b and 2b being formed bent and extending in the axial direction on the outside of each first bearing washer 1 and second bearing washer 2, flat tracks 1a and 2a are formed on the inside in a single plane with said first bearing washer 1 and second bearing washer 2. In addition, second bearing washer 2 is inserted into first bearing washer 1.

Window-shaped, punched out holes 1c, in this case two, are formed at equally arranged locations along the circumferential direction in flange 1b of first bearing washer 1. Projections 1d, which protrude toward the inside, are formed at locations on the leading edge of said flange 1b that correspond to these punched out holes 1c.

On the other hand, projection 2d, which protrudes toward the outside, is formed in the leading edge of flange 2b formed on second bearing washer 2. As a result of projection 2d engaging with the above-mentioned projection 1d of first bearing washer 1, first bearing washer 1 and second bearing 2 are prevented from separating, thus resulting in all component members being integrally assembled in a non-separated form.

Figure 3:
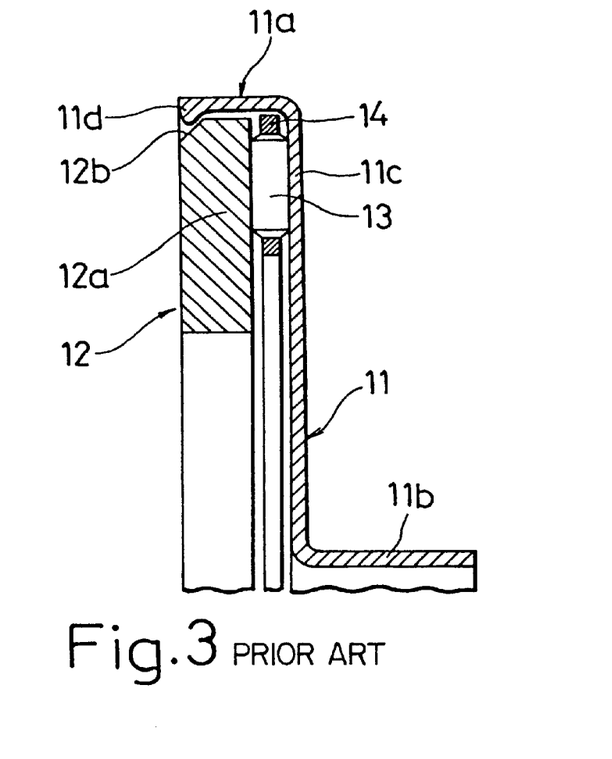
FIG. 3 is a longitudinal cross-sectional view of a portion of a thrust bearing as a second example of the prior art.
Figure 4:
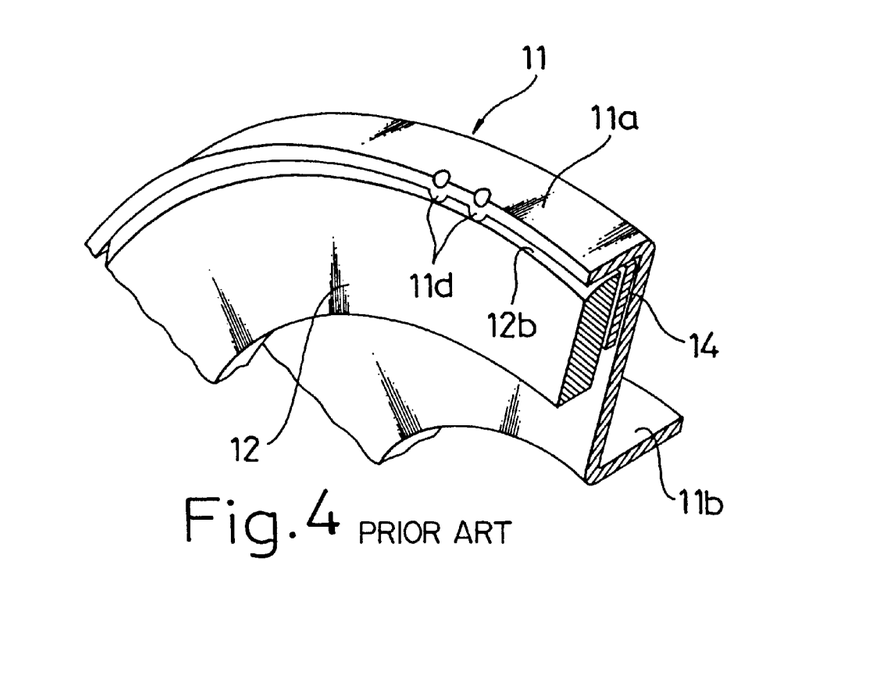
FIG. 4 is a perspective view of a portion of the thrust bearing shown in FIG. 3.

A second example of a thrust bearing of the prior art is shown in FIGS. 3 and 4. Furthermore, this thrust bearing is disclosed in Japanese Laid-Open Patent Publication No. 61-137116.

As shown in the drawings, said thrust bearing is equipped with a first bearing washer 11, on which cylindrical flanges 11a and 11b are provided bent and extending in mutually opposing directions in their respective axial directions on the outside and inside, a second bearing washer 12, formed into the shape of a flat plate and inserted into said first bearing washer 11 so that its track 12a relatively faces track 11c of said first bearing washer 11, rolling elements in the form of rollers 13, arranged and juxtaposed along the circumferential direction between said tracks 11c and 12a, and cage 14 formed into a circular shape that holds and guides these rollers 13.

Projections 11d, which protrude toward the inside, are formed at equally arranged locations along the circumferential direction on the leading edge of flange 11a of first bearing washer 11. In addition, notch 12b, which is chamfered and has a cross-section in the shape of a triangle, is formed in the corner at which the outer circumferential surface and outer surface intersect the second bearing washer 12, and the above-mentioned projections 11d, formed in first bearing washer 11, are inserted into this notch 12b. As a result, first bearing washer 11 and second bearing washer 12 are prevented from separating, thus resulting in all the component members being integrally assembled in a non-separated form.

In the thrust bearing shown in FIGS. 1 and 2 as a first example of the prior art, cylindrical flanges 1b and 2b are formed in both a first bearing washer 1 and a second bearing washer 2. The normal process for forming bearing washers having these flanges first involves obtaining flat, circular, semi-finished products by applying sheet steel, which is used for the raw material, to a press forming machine. Drawing is then performed on the outer edges of the semi-finished products by using a press forming machine to form the above-mentioned flanges 1b and 2b. Next, hardening is performed on the portions serving as the above-mentioned tracks 1a and 2a using, for example, cementation. Furthermore, carbon prevention treatment is performed on those portions where the above-mentioned projections 1d are formed at the time of the above-mentioned hardening, after which the projections 1d are formed in final process. In addition to this type of forming being complex and not always easy, it is also difficult to achieve a reduction in costs.

In addition, although projections 1d are formed as locking portions for the first bearing washer 1 to prevent first bearing washer 1 and second bearing washer 2 from separating, since these projections 1d are extremely small, there is the risk of the amount of protrusion of the projections will not reach the specified value (due to forming error and so forth) during forming of the projections 1d, or that the locking mechanism will not align in the case where the finished thrust bearing is handled poorly.

In addition, in this constitution, debris, moisture and other harmful foreign objects are able to easily penetrate inside the thrust bearing from outside. Conversely, grease and other lubricants filled inside the thrust bearing can easily leak to the outside, thus resulting in the disadvantage of replenishment of lubricant having to be performed relatively frequently in order to maintain favorable bearing function over a long period of time.

Moreover, in addition to the above factors, it has become desirable in recent years to develop thrust bearings that are able to secure a required load capacity while having compact size. Incidentally, in the above-mentioned constitution, since cylindrical flange 2b is formed on the second bearing washer 2, the outer diameter becomes larger at that portion.

On the other hand, for the thrust bearing shown in FIGS. 3 and 4 as a second example of the prior art, the second bearing washer 12 is formed into a simple flat plate. This can be easily obtained by performing press forming on the sheet steel used for raw material, and then performing hardening at the site which is to serve as track 12a.

However, cylindrical flanges 11a and 11b are provided on the outside and inside of the first bearing washer 11. The forming of a bearing washer having two flanges in this manner is even more difficult to obtain and results in higher costs than the forming of a bearing washer having one flange, such as that equipped on the thrust bearing as a first example of the prior art described above.

In addition, in this thrust bearing, projections 11d, in the form of locking portions formed on first bearing washer 11 to prevent the first bearing washer 11 and the second bearing washer 12 from being separated in the same manner as the thrust bearing indicated as a first example of the prior art, are extremely small. Thus, there is the risk of the locking by the projections 11*d* becoming misaligned. In addition, there are also similar problems in this thrust bearing as a second example of the prior art with respect to debris, moisture and other harmful foreign objects can easily penetrate inside the thrust bearing from the outside, and conversely, grease and other lubricants filled inside the thrust bearing can easily leak to the outside.

SUMMARY OF THE INVENTION

In consideration of the above-mentioned disadvantages of the prior art, the object of the present invention is to provide a thrust bearing that together with being able to be easily formed, prevents separation of its component members, prevents penetration of debris, moisture and other harmful foreign objects from the outside, maintains the internal retention of filled lubricant over a long time, and secures load capacity while having a compact size.

The thrust bearing according to the present invention is equipped with a first bearing washer provided with a cylindrical flange bent and extending in the axial direction on the outside, the inside of which is in a single plane with a flat track; a second bearing washer in the shape of a flat plate is inserted into the first bearing washer so that corresponding tracks relatively face each other; a plurality of rolling elements are juxtaposed between the tracks; and, a cage having a circular shape, holds and guides the rolling elements. In construction a notch, having a roughly rectangular cross-section that opens in its outer circumferential surface and outer surface, is formed in the second bearing washer over the entire circumference. The leading edge of the flange is inserted into the notch by bending it toward the center of the thrust bearing. The inner diameter of the cage roughly coincides with the inner diameter of said first bearing washer or said second bearing washer.

In a thrust bearing having this constitution, as a result of the leading edge of the flange formed in the first bearing washer being inserted into the notch formed in the second bearing washer, a mutual separation of both the bearing washers is prevented. Moreover, penetration of foreign objects from the outside is also prevented, and conversely, leakage of lubricant filled into the inside is inhibited. In addition, since the shaft member is to be borne fitting loosely in the above-mentioned cage, the cage is positioned concentrically with respect to the first bearing washer or the second bearing washer.

DESCRIPTION OF THE PREFERRED EMBODIMENTS

The following provides an explanation of the embodiments of the present invention with reference to the attached drawings.

Figure 5:
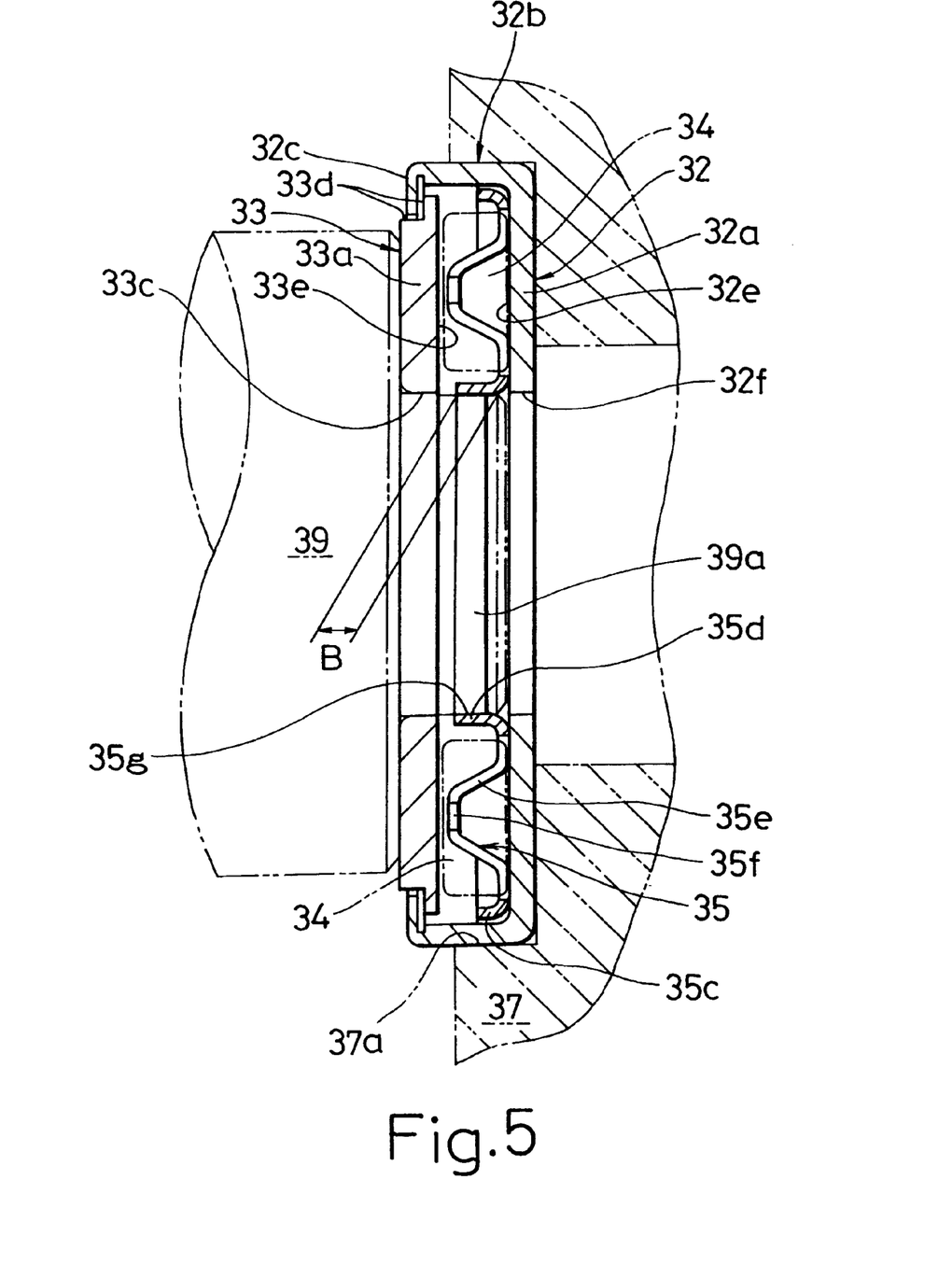
FIG. 5 is a longitudinal cross-sectional view of a thrust bearing in the first embodiment of the present invention.

FIG. 5 indicates a thrust bearing as a first embodiment of the present invention. As shown in the drawing, the thrust bearing is equipped with a first bearing washer 32 and second bearing washer 33, in which corresponding tracks 32*a* and 33*a* are respectively formed in a circular shape to relatively face each other, a plurality of rolling elements in the form of rollers 34 are arranged and juxtaposed along the circumferential direction between both the tracks 32*a* and 33*a*, and cage 35 is formed into a circular shape that holds and guides these rollers 34.

Together with cylindrical flange 32*b* bent and extending toward the axial direction formed on its outside, the inside of the first bearing washer 32 is in a single plane with flat track 32*a*. The first bearing washer 32 is fit into countersunk portion 37*a* formed in housing 37 equipped on, for example, a general mechanical apparatus.

On the other hand, the second bearing washer 33 is simply formed into a flat plate and inserted into the first bearing washer 32. Small diameter portion 39*a* formed on the end of shaft member 39 fits into center hole 33*c* of the second bearing washer 33.

Notch 33*d*, having a roughly rectangular cross-section and opened in the outer circumferential surface and outer surface of the second bearing washer 33, is formed in the second bearing washer 33 over its entire circumference. In addition, the leading edge 32*c* of flange 32*b* formed on the first bearing washer 32 is bent at a right angle toward the center of the bearing and is inserted into the notch 33*d*. Furthermore, as shown in the drawing, the thickness of the leading edge 32*c* of flange 32*b* is less than that of other portions. As a result, bending of the leading edge 32*c* can be performed easily.

As described above, as a result of leading edge 32*c* of flange 32*b* (formed in the first bearing washer 32) being formed bent to the inside of the first bearing washer 32 over its entire circumference, and the leading edge 32*c* being inserted into notch 33*d* formed in the second bearing washer 33, the first bearing washer 32 and second bearing washer 33 are prevented from separating. This locking state resulting from the leading edge of the flange being bent and formed over the entire circumference is rigid, thereby preventing separation of the component members, including the first bearing washer 32, second bearing washer 33, rollers 34 and cage 35.

In addition, according to the above-mentioned constitution, a labyrinth seal is formed by the above-mentioned notch 33*d* and flange leading edge 32*c* inserted therein. This seal prevents penetration of debris, moisture and other harmful foreign objects from the outside, while also inhibiting grease and other lubricants (not shown) filling the inside of the thrust bearing from leaking to the outside. Accordingly, a more favorable bearing function is maintained for a long time even if the lubricant is added infrequently.

The following provides an explanation the process for producing the above-mentioned first bearing washer 32 and second bearing washer 33.

First, with respect to the first bearing washer 32, having flange 32b on its outside, the raw material in the form of sheet steel is first applied to a press forming machine to obtain a circular semi-finished product. Next, drawing of the outer portion of the semi-finished product is performed by a press forming machine to form the above-mentioned flange 32b. Furthermore, it is preferable to simultaneously form a thin-walled portion to serve as the flange leading edge 32c at this time. Following this, hardening by cementation is performed on this semi-finished product at the portion that will serve as the above-mentioned track 32a, and particularly at the surface layer that includes track surface 32e. Furthermore, carbon prevention treatment is performed during the above-mentioned hardening in the vicinity of flange leading edge 32c to maintain a flexible state to enable bending, namely plastic forming.

On the other hand, with respect to the second bearing washer 33, since the second bearing washer 33 is in the form of a simple flat plate, it can be easily obtained by performing press forming on the sheet steel used as the raw material, and then performing hardening on the portion serving as track 33a, and particularly on the surface layer that includes track surface 33e. Furthermore, it is preferable that notch 33d be formed simultaneously to this press forming.

As described above, in the thrust bearing, the only bearing washer that has a flange is the first bearing washer 32, and the only portion on which the flange is provided is the outside. In addition, since a simple flat plate not having a flange is used to form for the second bearing washer 33, and the work performed while performing carbon prevention treatment in the vicinity of the flange leading edge is held to a minimum, forming is easy and cost reductions are achieved.

However, of the thrust bearing, either the above-mentioned first bearing washer 32 or second bearing washer 33 is made thick-walled with respect to the other. In this embodiment, the second bearing washer 33 is made thick-walled with respect to the first bearing washer 32. The effects described below are offered as a result of employing this constitution.

Namely, during use of the thrust bearing, although shaft member 39 is inserted into the inside of the above-mentioned second bearing washer 33, as a result of the second bearing washer 33 being thick-walled, twisting of the second bearing washer 33 with respect to the engaging portion of the shaft member 39 is prevented during insertion. Accordingly, no damage occurs to the shaft member 39, and deformation of second bearing washer 33 is prevented.

Furthermore, in contrast to the constitution of the present embodiment, the thrust bearing can also be used by designating the second bearing washer 33 as the stationary side and the first bearing washer 32 as the rotating side, and inserting shaft member 39 into center hole 32f of the first bearing washer 32. In this case, the first bearing washer 32 is made thicker than the second bearing washer 33. In addition, although the second bearing washer 33 is made thick-walled over its entire circumference in the present embodiment, the above-mentioned effects are still obtained even if only the inside is made thick-walled while other portions are relatively thin.

Next, the following provides a detailed description of rollers 34, positioned between each track surface 32e and 33e of the above-mentioned first bearing washer 32 and second bearing washer 33 and which bear the load while rolling over the track surfaces, and cage 35 that holds and guides the rollers 34.

Figure 6:
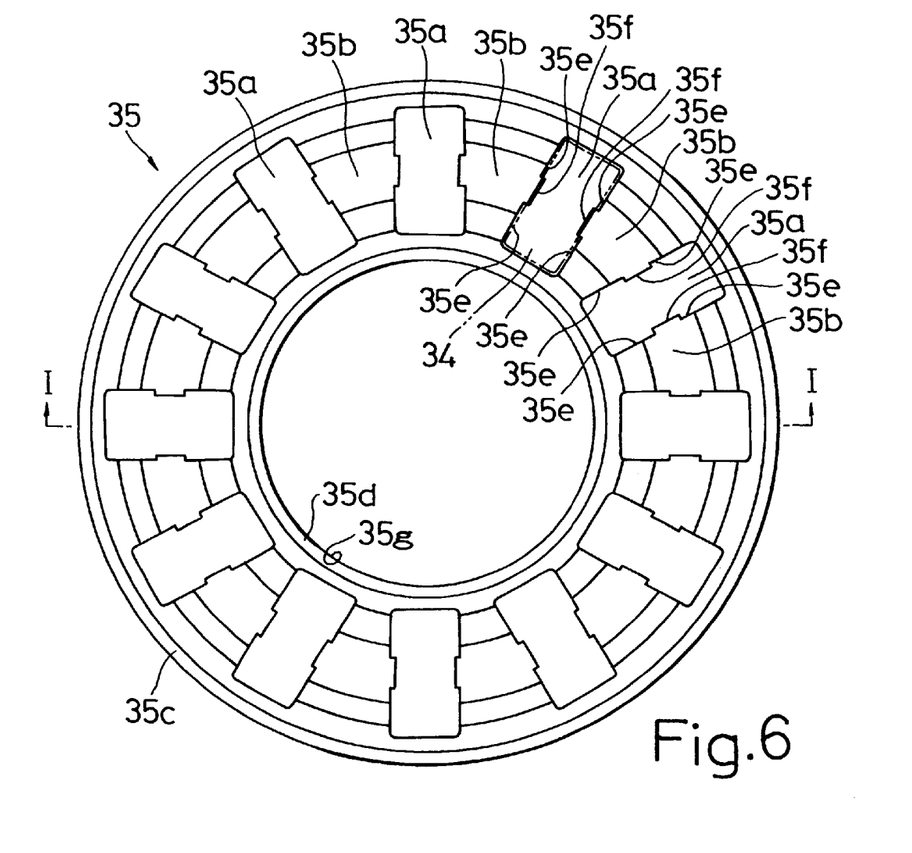
FIG. 6 is a top view of a cage and rollers equipped on the thrust bearing shown in FIG. 5.
Figure 7:
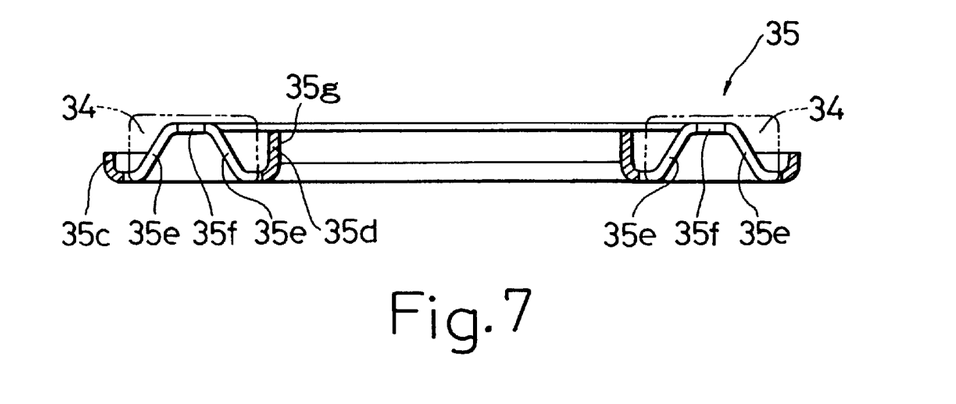
FIG. 7 is a cross-sectional view taken along section I—I relating to FIG. 6.

As shown in FIGS. 5 through 7, rollers 34 are formed into a cylindrical shape, and twelve of the rollers 34 are provided in the case of the present embodiment.

Cage 35 has twelve columns 35b (see FIG. 6) that demarcate pockets 35a (see FIG. 5), the outside and inside portions of which are integrated into a single unit, arranged in a row in the circumferential direction, and into which rollers 34 are inserted together with the outside and inside portions, and cylindrical flanges 35c and 35d formed on the outside and inside are bent and extend toward the same axial direction. The central portion of each of the columns 35b is bent into roughly a trapezoidal shape in the same axial direction as each of the flanges 35c and 35d. Furthermore, together with both sides serving as roller guiding surfaces 35e, holding projection 35f is formed in each column 35b that holds rollers 34 by protruding into pocket 35a farther than said roller guiding surfaces 35e.

Although cage 35 having the above-mentioned constitution should be referred to as M type since it is formed such that the shape of its cross-section is roughly that of the letter "M", the use of this M-shaped cross-section cage resulting in increased rigidity of the cage 35, while also being able to secure a large load capacity while achieving a compact size for the thrust bearing.

However, as is clear from FIG. 5, the inner diameter of the above-mentioned cage 5 is made to roughly coincide with the inner diameter of the above-mentioned first bearing washer 32 or second bearing washer 33. According to this constitution, since the arranged position of each roller 34 can be brought closer to the inside of the bearing, the outer diameter of the bearing can be made correspondingly smaller, thus enabling compact size to be achieved while securing load capacity. In addition, in this constitution, a so-called shaft guiding state results from a small diameter portion 39a of shaft member 39 fitting loosely in center hole 35g of the cage 35. As a result, the cage 35 is positioned concentrically to the first bearing washer 32 and the second bearing washer 33, there is no deflection in the radial direction, a contact by cage 35 with the inner surface of flange 32b of the first bearing washer 32 is prevented. Thus, a bearing can be provided in which the flange inner surface, which is not hardened and soft, is not susceptible to damage, and which demonstrates favorable rotation without generation of abrasion particles.

In addition, in the above-mentioned cage 35, flange 35d provided on its inside, is provided over a wide width (indicated with dimension B in FIG. 5) between each track 32a and 33a of the above-mentioned first bearing washer 32 and second bearing washer 33. According to this constitution, the contact surface of cage 35 with shaft member 39 is increased and the contact surface pressure is reduced, thus resulting in the effect of preventing mutual damage between the shaft member 39 and cage 35.

The following provides an explanation of the assembly procedure of the present thrust bearing.

First, each roller 34 is installed in cage 35. More specifically, in cage 35 of the present embodiment, a single-sided retaining structure is employed wherein a holding projection for holding rollers 34 is not formed on the side of first bearing washer 32 to enable rollers 34 to be removed, while holding projection 35f is provided only on the side of second bearing washer 33. However, a double-sided retaining structure may naturally be employed in which holding projections are provided on both sides. Next, cage 35 is installed so that the lateral surface serving as the side of the first bearing washer 32 is facing up, and while in this state, rollers 34 are installed within each pocket 35a (see FIG. 6). Following this, the first bearing washer 32 having flange 32b, extending straight prior to bending of leading edge 32c, is placed over cage 35, and turned over together with the cage 35. While in this state of being turned over, the second bearing washer 33 is inserted into the first bearing washer 32, and the above-mentioned leading edge 32c of flange 32 is bent by roll forming and so forth to form an integrated unit. This completes the present thrust bearing.

Figure 8:
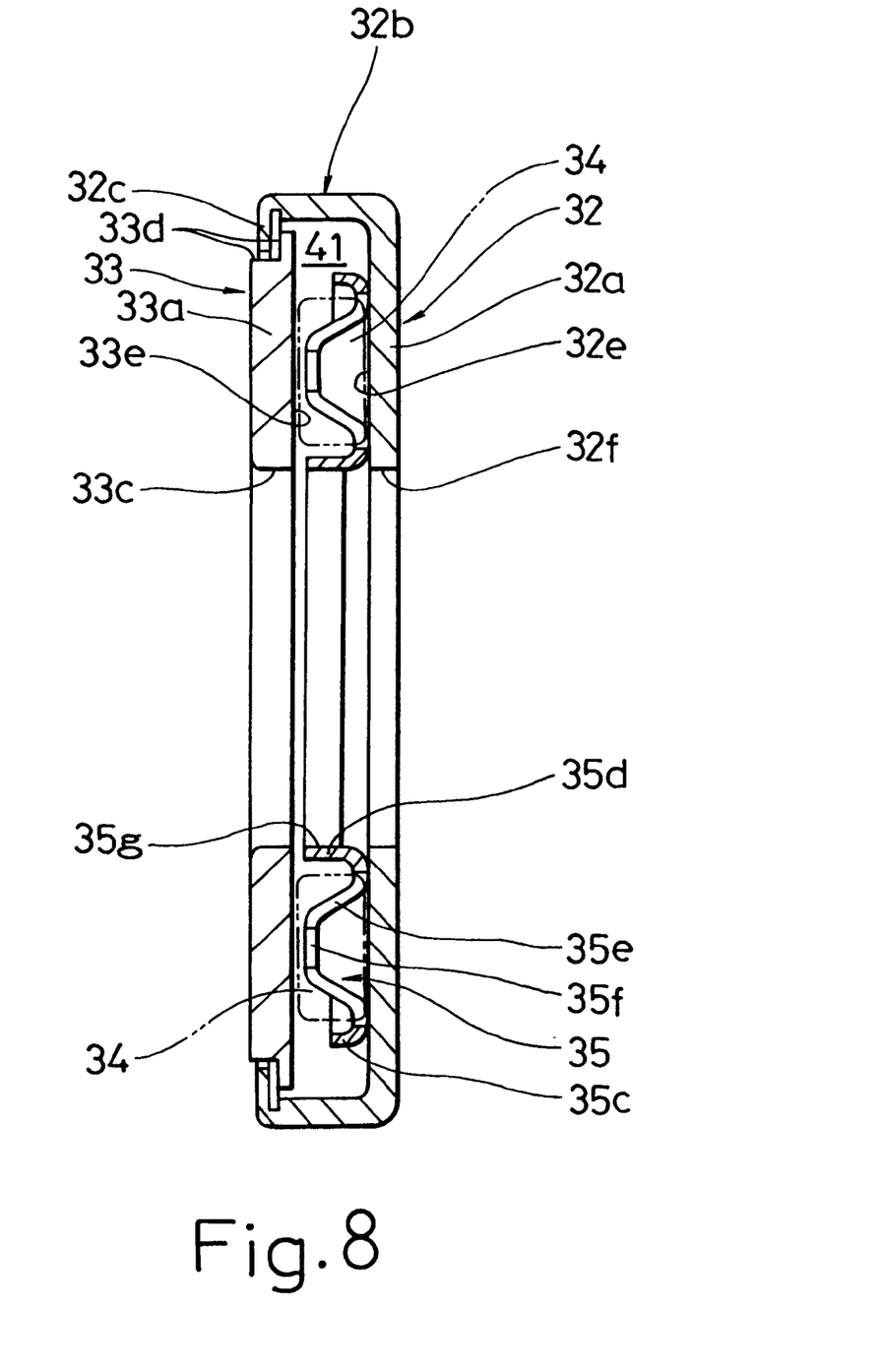
FIG. 8 is a longitudinal cross-sectional view of a thrust bearing in the second embodiment of the present invention.

Next, the following provides an explanation of a thrust bearing as a second embodiment of the present invention based on FIG. 8. Furthermore, since said thrust bearing is composed in the same manner as the thrust bearing indicated as a first embodiment of the present invention in FIGS. 5 through 7, with the exception of those portions explained below, an explanation of the overall bearing is omitted, with an explanation provided only for the essential portions. In addition, in the following explanation, the same reference numerals are used for those constituent portions that are identical or correspond with the constituent portions of the thrust bearing of the first embodiment. Furthermore, these provisions apply similarly for the third embodiment to be described in a later section as well.

As shown in FIG. 8, in the thrust bearing, a prescribed gap 41 is formed between flange 32b formed on the outside of the first bearing washer 32 and the outside of cage 35. This gap 41 enables a large amount of lubricant such as grease to be filled. Thus, lubricant action can be maintained for an even longer period of time.

Figure 9:
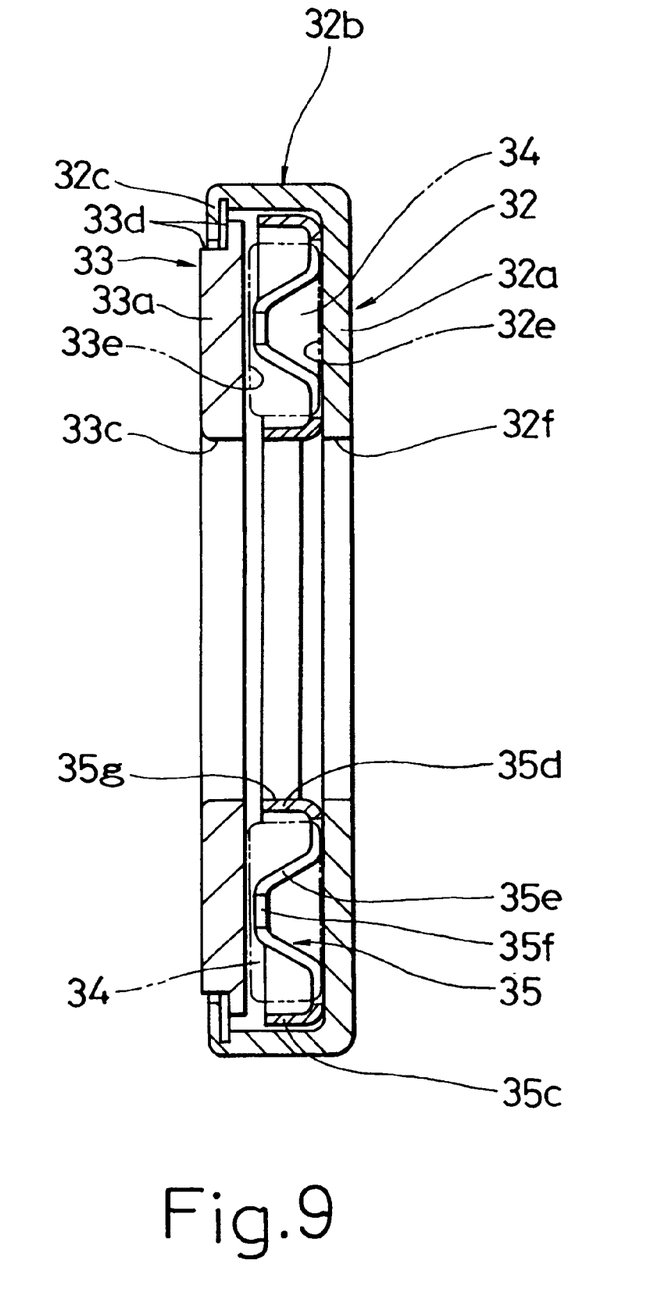
FIG. 9 is a longitudinal cross-sectional view of a thrust bearing in the third embodiment of the present invention.

A thrust bearing as a third embodiment of the present invention is indicated in FIG. 9.

As shown in the drawing, the lengths of flanges 35c and 35d on the outside and inside of cage 35 are set to be equal. The following effects are obtained as a result of this.

First, in the case of forming a cage 35 having this shape, although a raw material consisting of sheet steel in the shape of a circular, flat plate is made available followed by press forming of that sheet steel, since the lengths of flanges 35c and 35d on the outside and inside are equal as described above, the amount of drawing by the press for forming each of the flanges should be set in a similar manner for both the inside and outside, thus facilitating fabrication of the mold for press forming and enabling the cage to be formed easily and inexpensively.

Next, although cage 35 receives an outward facing load based on the centrifugal force of the rolling elements in the form of rollers 34 during operation of the thrust bearing, by forming a wide flange 35c on the outside of the cage as described above, sufficient rigidity with respect to this outward facing load is obtained.

Furthermore, although rollers are used for the rolling elements in the thrust bearings of each of the embodiments described above, the present invention can naturally also be applied to a thrust bearing in which balls are used for the rolling elements.

As has been explained above, the thrust bearing according to the present invention has a first bearing washer, having a circular flange formed on the outside that is bent and extends toward the axial direction, the inside of the first bearing washer being in a single plane with a flat track, and a second bearing washer in the shape of a flat plate that is inserted into the first bearing washer so that their corresponding tracks relatively face each other.

Thus, the only bearing washer that has a flange is the first bearing washer on one side, and the only portion on which said flange is provided is the outside. In addition, since a simple flat plate not having a flange is formed for the second bearing washer, and work performed while performing carbon prevention treatment in the vicinity of the flange leading edge is held to a minimum, forming is easy and cost reductions are achieved.

In addition, since a notch having a roughly rectangular cross-section is formed in the circumferential surface and outer surface of the above-mentioned second bearing washer over its entire circumference, and the above-mentioned leading edge of the flange formed in the first bearing washer is bent toward the inside and inserted into the notch, the first bearing washer and second bearing washer are prevented from coming apart. The locking state resulting from the flange leading edge bent and formed over the entire circumference as a locking portion is rigid, and prevents separation of each constituent member consisting of the first bearing washer, second bearing washer, rolling elements and cage.

In addition, according to this constitution, a labyrinth seal is composed by the above-mentioned notch and the flange leading edge inserted therein. This seal prevents penetration of debris, moisture and other harmful foreign objects from the outside, while also inhibiting grease and other lubricants (not shown) filled inside the thrust bearing from leaking to the outside. Accordingly, favorable bearing function is maintained for a long time even if lubricant is added infrequently.

Moreover, in the thrust bearing according to the present invention, the inner diameter of the above-mentioned cage is made to roughly coincide with the inner diameter of the above-mentioned first bearing washer or second bearing washer. According to said constitution, since the arranged position of each rolling element can be brought closer to the inside of the bearing, the outer diameter of the bearing can be made correspondingly smaller, thus enabling compact size to be achieved while securing load capacity. Furthermore, since the second bearing washer inserted into the first bearing washer does not have a flange, the outer diameter of the entire bearing can be made smaller. In addition, in this constitution, a so-called shaft guiding state results from the shaft member fitting loosely in the cage. As a result, the cage is positioned concentrically to the first bearing washer and second bearing washer, there is no deflection in the radial direction, a contact by the cage with the inner surface of the flange of the first bearing washer is prevented. Thus, a bearing can be provided in which the flange inner surface, which is not hardened and soft, is not susceptible to damage, and which demonstrates favorable rotation without generation of abrasion particles.

In addition, in the thrust bearing according to the present invention, either the above-mentioned first bearing washer or second bearing washer is made to be thick-walled with respect to the other at least at its inside. The effects described below are offered as a result of employing this constitution.

Namely, during use of the thrust bearing, although the shaft member is inserted into the inside of the above-mentioned first bearing washer or second bearing washer, as a result of one of the bearing washers being thick-walled, twisting of the bearing washer with respect to the engaging portion of the shaft member is prevented during insertion. Accordingly, there is no damage to the shaft member, and deformation of the bearing washer is prevented.

In addition, in the thrust bearing according to the present invention, a cylindrical flange is formed on the inside of the above-mentioned cage that is bent and extends in the radial direction. The flange is provided over a wide width between each track of the above-mentioned first bearing washer and second bearing washer. According to this constitution, the contact surface of the cage with the shaft member to is increased and contact surface pressure is reduced, thus resulting in the effect of preventing mutual damage between the shaft member and the cage.

Next, in the thrust bearing according to the present invention, a prescribed gap is formed between the flange formed on the outside of the above-mentioned first bearing washer and the outside of the above-mentioned cage. This gap enables a large amount of lubricant such as grease to be filled. Thus, lubricant action can be maintained for an even longer period of time.

In addition, in the thrust bearing according to the present invention, the above-mentioned cage has columns that demarcate pockets, the outside and inside portions of which are integrated into a single unit, arranged in a row in the circumferential direction, and into which rolling elements are inserted together with the outside and inside portions, and cylindrical flanges provided on the outside and inside that are bent and extending toward the same axial direction. The central portion of each of the columns is bent in the axial direction, and the lengths of each of the flanges on the outside and inside are set to be roughly equal.

Namely, although the cage having this constitution should be referred to as an M type since it is formed such that the shape of its cross-section is roughly that of the letter "M", the use of this M-shaped cross-section cage results in increased rigidity of the cage, while also being able to secure a large load capacity while achieving compact size of the thrust bearing.

In addition, the lengths the flanges on the outside and inside of the cage are set to be equal based on this constitution. The following effects are obtained as a result of this.

First, in the case of forming a cage having this shape, although a raw material consisting of sheet steel in the shape of a circular, flat plate is made available followed by press forming of that sheet steel, since the lengths of the flanges on the outside and inside are equal as described above, the amount of drawing and so forth by the press for forming each of the flanges should be set in a similar manner for both the inside and outside, thus facilitating fabrication of the mold and so forth for press forming and enabling forming of the cage to be performed easily and inexpensively.

Next, although the cage receives an outward facing load based on the centrifugal force of the rolling elements during operation of the thrust bearing, by forming a wide flange on the outside of the cage as described above, sufficient rigidity with respect to this outward facing load is obtained.

What is claimed is:

1. A thrust bearing comprising:

a first bearing washer having an integral cylindrical flange formed as a single piece with said first bearing washer by bending an outer peripheral edge of a circular seat plate having a flat track into an L-letter shape, an outer cylindrical surface of said cylindrical flange having a substantially constant radius over the entire length of said cylindrical flange in an axial direction thereof;

a second bearing washer comprising a circular seat flat plate which has a flat track so as to face a track of said first bearing washer;

a plurality of rolling elements juxtaposed between said tracks; and a circular cage that holds and guides said rolling elements, said thrust bearing comprising a single constitutive unit which is assembled by inserting said cage holding said rolling elements and said second bearing washer into said cylindrical flange of said first bearing washer, wherein an outer circumferential surface of said second bearing washer has a stepped notch portion, a leading edge of said cylindrical flange of said first bearing washer has a wall thickness thinner than said cylindrical flange, and is inserted into said notch portion in a state of being bent over the entire circumference thereof with a slight clearance without projecting from an outer seat surface of said second bearing washer, said second bearing washer has a wall thickness thicker than said first bearing washer, and said cage is formed by bending a circular steel plate, and a cylindrical surface of a bent inner peripheral edge of said cage has substantially the same inner diameter as said first and second bearing washers, said cage being provided between said tracks.

2. A thrust bearing as set forth in claim 1, further comprising:

a prescribed gap formed between the flange of said first bearing washer and an outside portion of said cage.

3. A thrust bearing as set forth in claim 1, wherein said cage further comprises columns circumferentially disposed within said thrust bearing having pockets for disposing said rolling elements, wherein each of said columns further comprises first and second cylindrical flanges formed respectively at an inner and an outer edge thereof and bent in an axial direction defined by an axis extending through a center of said thrust bearing therefrom, said first and second cylindrical flanges being of roughly equal length to one another, wherein a central portion of each of said columns guides said rolling elements.

* * * * *